United States Patent
Lenzini et al.

(10) Patent No.: US 7,336,610 B2
(45) Date of Patent: *Feb. 26, 2008

(54) SCHEDULING A SHARED RESOURCE AMONG SYNCHRONOUS AND ASYNCHRONOUS PACKET FLOWS

(76) Inventors: Luciano Lenzini, c/o Tilab S.p.A. via Reiss Romoli, 274-10148, Torino (IT); Enzo Mingozzi, c/o Tilab S.p.A. via Reiss Romoli, 274-10148, Torino (IT); Enrico Scarrone, c/o Telecom Italia Lab S.p.A. via Reiss Romoli 274, I-10148 Torino (IT); Giovanni Stea, c/o Telecom Italia Lab S.p.A. via Reiss Romoli 274, I-10148 Torino (IT)

( * ) Notice: Subject to any disclaimer, the term of this patent is extended or adjusted under 35 U.S.C. 154(b) by 515 days.

This patent is subject to a terminal disclaimer.

(21) Appl. No.: 10/511,187

(22) PCT Filed: Jul. 1, 2002

(86) PCT No.: PCT/IT02/00430

§ 371 (c)(1),
(2), (4) Date: Oct. 12, 2004

(87) PCT Pub. No.: WO03/088605

PCT Pub. Date: Oct. 23, 2003

(65) Prior Publication Data

US 2005/0147030 A1    Jul. 7, 2005

(30) Foreign Application Priority Data

Apr. 12, 2002    (IT)    ............................ TO2002A0326

(51) Int. Cl.
*H04L 12/26*    (2006.01)
(52) U.S. Cl. ...................... 370/235; 370/412; 370/503

(58) Field of Classification Search ................ 370/229, 370/230, 231, 232, 412, 503
See application file for complete search history.

(56) References Cited

U.S. PATENT DOCUMENTS 5,404,424 A    4/1995    Zhao (Continued)

FOREIGN PATENT DOCUMENTS

EP    1 035 751    9/2000

(Continued)

*Primary Examiner*—Ricky Q. Ngo
*Assistant Examiner*—Kan Yuen
(74) *Attorney, Agent, or Firm*—Andrew Wilford

(57) ABSTRACT

Each synchronous flow ($i=1, 2 \ldots, N_s$) is associated to a respective synchronous capacity value ($H_i$) that is related the period of time for which a synchronous flow can be serviced before the server moves on. This value can be selected either according to a local allocation criteria or according to a global allocation criteria. Each asynchronous flow ($i=1, 2, \ldots, N_A$) s is associated to a respective first value indicating the delay to be made up so that the respective queues has the right to be serviced and to another value indicating the instant in which the server visited the respective queue associated to a synchronous flow (h) is then serviced for a period of time that is related to be aforesaid synchronous capacity value, while each queue associated to an asynchronous flow (i) is serviced only if the server's visit occurs before the expected moment. The server's visit (10) to the synchronous queues should preferably take place during two successive cycles in order to optimise the use of the resources available.

34 Claims, 1 Drawing Sheet

U.S. PATENT DOCUMENTS

| | | |
|---|---|---|
| 6,091,709 A | 7/2000 | Harrison |
| 6,147,970 A | 11/2000 | Troxel |
| 6,469,991 B1 * | 10/2002 | Chuah ........................ 370/329 |
| 6,570,883 B1 * | 5/2003 | Wong ......................... 370/412 |
| 7,116,679 B1 * | 10/2006 | Ghahremani ................ 370/463 |

FOREIGN PATENT DOCUMENTS

WO        02/ 35 777       5/2002

* cited by examiner

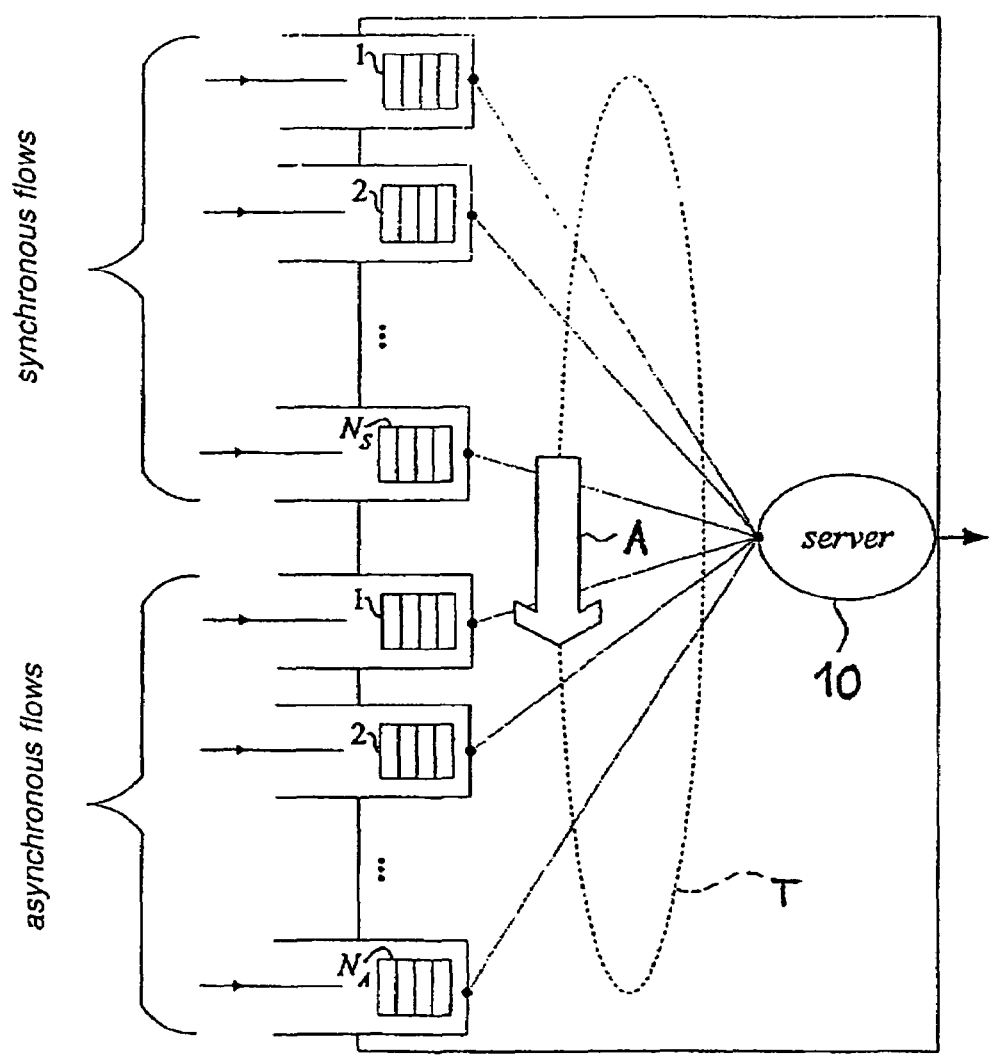

SCHEDULING A SHARED RESOURCE AMONG SYNCHRONOUS AND ASYNCHRONOUS PACKET FLOWS

This invention refers to the packet communication systems, and in particular to the scheduling criteria of a shared resource, i.e. the criteria used to select the packet to which the resource is to be assigned each time this occurs.

The solution given in the invention has been developed both for radio resource scheduling (e.g.: MAC or Medium Access Control level scheduling), and for the scheduling of computational and transmissive resources in the network nodes, for example, for flow scheduling with different service quality on Internet Protocol router (IP). The following description is based especially on the latter application example, and is given purely as an example and does not limit the scope of the invention.

INTRODUCTION

For several years now, the widespread application and rapid evolution of the packet networks have given rise to the problem of integrating the traditional services offered by the old generation packet networks (electronic mail, web surfing, etc.) and the new services previously reserved for circuit switching networks (real-time video, telephony, etc.) into the so-called integrated services networks.

Systems like UMTS, for example, for which a fixed packet network component (core network) is envisaged, must simultaneously handle voice and data services, and offer support for the development of new services be they real-time or not.

The integrated services networks must therefore be able to handle traffic flows with different characteristics and to offer each type of flow a suitable service quality, a set of performance indexes negotiated between user and service provider, which must be guaranteed within the term agreed upon.

One of the key elements in providing the service quality requested is the scheduling system implemented on the network nodes, i.e. the system used to select the packet to be transmitted from those present on the node; this system must obviously embody contrasting characteristics like flexibility, in terms of capacity to provide different types of services, simplicity, a characteristic that makes it possible to use in environments that require high transmission speeds and the handling of numerous transmission flows, and efficiency in the use of the shared resource (e.g. the transmissive means).

The need to guarantee a given level of service quality (or Qos) in the packet networks is constantly increasing, as can be seen for example in the documents U.S. Pat. No. 6,091, 709, U.S. Pat. No. 6,147,970 or EP-A-1 035 751.

This invention in fact is the development of the solution described in the industrial invention patent request TO2000A001000 and in the corresponding request PCT/IT 01/00536.

The previous solution basically applies to the scheduling of a service resource shared between several information packet flows in which the flows generate respective associated queues and are serviced when the server gives permission to transmit.

The flows are divided into synchronous flows, which require a minimum service rate guarantee, and into asynchronous flows, which use the service capacity of the resource that is left unused by the synchronous flows. The solution in question includes the following:

provides a server that visits the queues associated with the flows in successive cycles, granting each queue a target token rotation time (or "revolution"), called TTRT, which identifies the time required for the server to complete the queue visiting cycle, associates each synchronous flow with a synchronous capacity value indicating the maximum time the synchronous flow can be serviced before its transmission permission is revoked by the server, associates each asynchronous flow with a first lateness (i) value, indicating the delay that must be made up for the respective queue to have the right to be serviced, plus another value (last_token_time) indicating the moment the server visited the respective queue in the previous cycle, which determines the time elapsed since the server's previous visit, services each queue associated to a synchronous flow for a maximum period of time equal to the above-mentioned synchronous capacity value, and services each queue associated to an asynchronous flow only if the server's visit occurs before the expected moment. This advance is obtained from the difference between the aforesaid TTRT time and the time that has elapsed since the server's previous visit and the accumulated delay.

If this difference is positive it defines the maximum service time for each queue associated to an asynchronous flow.

The solution referred to above has proved to be completely satisfactory from an operational point of view. The experience gained by the "Petitioner" has however shown that the solution can be further developed and improved as illustrated in this invention.

This applies particularly to the following aspects:

the possibility of offering different types of service while keeping computational costs low: an important feature for computer network applications that must guarantee service quality for its users, like the IP networks with Intserv (Integrated Services, as per IETF specification) or Diffserv (Differentiated Integrated Services, as per IETF specification), or for the radio resource scheduling systems like the MAC level scheduling algorithms (W-LAN systems, third generation radio-mobile services);

the possibility of guaranteeing the bit rate of the various flows, the maximum queuing delay and the maximum occupation of the buffers of each flow for synchronous traffic;

flexibility, in terms of capacity to provide two different types of services at the same time, rate-guaranteed (suitable for synchronous flows) and fair queuing (suitable for asynchronous flows), especially in service integration networks;

the possibility of isolating transmission flows, i.e. it makes the service offered to a single flow independent from the presence and behaviour of other flows;

low computational complexity in terms of the number of operations necessary to select the packet to be transmitted; this feature makes it possible to use in environments that require high transmission speeds and the handling of numerous transmission flows, also in view of a possible implementation in hardware;

adaptability, in the sense that it can handle a change in the operating parameters (e.g. the number of flows present) by redistributing its resources without having to resort to complex procedures; and analytic describability, i.e. it gives a complete analytic description of the system's behaviour, which makes it possible to relate the service quality measurements to the system parameters.

Another important aspect is equity, i.e. the possibility to manage in the same way both the transmission flows that receive a rate-guaranteed service, and those that receive a fair-queuing service, giving each one a level of service that is proportional to that requested, even in the presence of packets of different lengths.

DESCRIPTION OF THE INVENTION

The aim of this invention is to develop even further the already known solution referred to previously with special attention to the aforesaid aspects.

According to this invention, this aim can be reached by using a scheduling procedure having the characteristics referred to specifically in the following claims.

The invention also refers to the relative system.

Briefly, the solution given in the invention operates a scheduling system that can be defined with the name introduced in this patent request—Packet Timed Token Service Discipline or PTTSD.

At the moment, this scheduling system is designed to work on a packet-computer network switching node and is able to multiplex a single transmission channel into several transmission flows.

The system offers two different types of service: rate-guaranteed service, suitable for transmission flows (henceforth, "synchronous flows") that require a guaranteed minimum service rate, and a fair-queueing service, suitable for transmission flows (henceforth "asynchronous flows") that do not require any guarantee on the minimum service rate, but which benefit from the greater transmission capacity available. The system provides the latter, however, with an equal sharing of the transmission capacity not used by the synchronous flows.

The traffic from each transmission flow input on the node is inserted in its own queue (synchronous or asynchronous queues) from which it will be taken to be transmitted. The server visits the queues in a fixed cyclic order and grants each queue a service time established according to precise timing constraints at each visit.

The server initially visits the synchronous queues twice during a revolution, thus completing a major cycle and a minor or recovery cycle, and then moves on to visit the asynchronous queues.

BRIEF DESCRIPTION OF THE FIGURE

The following description of the invention is given as a non-limiting example, with reference to the annexed drawing, which includes a single block diagram figure that illustrates the operating criteria of a system working according to the invention.

DESCRIPTION OF A PREFERRED FORM OF EXECUTION

A scheduling system as given in the invention is able to multiplex a single transmission channel into several transmission flows.

The system offers two different types of service: a rate-guaranteed service, suitable for transmission flows (henceforth i synchronous flows where i=1, 2, ..., $N_S$) that require a guaranteed minimum service rate, and a best-effort service, suitable for transmission flows (henceforth j asynchronous flows where j=1, 2, ..., $N_A$) that do not require any guarantee on the service rate. The system provides the latter, however, with an equal sharing of the transmission capacity not used by the synchronous flows.

It should be supposed that $N_S$ and $N_A$ are non-negative integers and that each synchronous flow i=1 ... $N_s$ requires a service rate equal to $r_i$, and that the sum of the service rates requested by the synchronous flow does not exceed the capacity of channel C $$\left(\sum_{i=1}^{N_S} r_i \le C\right).$$

The traffic from each transmission flow input on the node is inserted in its own queue (synchronous or asynchronous queues will be discussed later) from which it will be taken to be transmitted. The server 10 visits the queues in a fixed cyclic order (ideally illustrated in the figure of the drawings with trajectory T and arrow A), granting each queue a service time established according to precise timing constraints at each visit.

The procedure referred to in the invention includes an initialisation stage followed by cyclic visits to the queues. These procedures will be discussed below.

Initialisation

First of all, it is necessary to give the system the information relating to the working conditions: how many synchronous flows there are (in general: $N_S$), what the transmission rate requested by each synchronous flow is, how many asynchronous flows there are, the target rotation time (TTRT), i.e. how long a complete cycle during which the sever visits all the queues once is to last.

Synchronous Flows

Each synchronous flow i, i=1 ... $N_s$, associated, according to an appropriate allocation policy, to a variable $H_i$ (synchronous capacity), which measures the maximum time for which the traffic of a synchronous flow can be transmitted before the server takes the transmission permission away. The possible allocation policies will be described below. A variable $\Delta_i$, initially nil, is associated to each synchronous flow, and stores the amount of transmission time available to the flow.

Asynchronous Flows

Each asynchronous flow j, j=1 ... $N_A$, is associated with two variables, $L_j$ and $last\_visit\_time_j$; the first variable stores the delay or lag that must be made up for the asynchronous queue j to have the right to be serviced; the second variable stores the instant the server visited the asynchronous queue j in the previous cycle. These variables are respectively initialised to zero and to the instant the revolution in progress when the flow is activated started.

This way of proceeding means that the asynchronous flows can be activated at any moment, not necessarily at system startup.

Visit to a Generic Synchronous Queue i, with i=1 ... $N_S$ During the Major Cycle A synchronous queue can be serviced for a period of time equal to the maximum value of the variable $\Delta_i$. This variable is incremented by $H_i$ (value decided during initialisation) when the queue is visited in the major cycle, and decremented by the transmission time of each packet transmitted.

The service of a queue during the major cycle ends when either the queue is empty (in which case the variable $\Delta_i$ is reset), or the time available (represented by the current value of $\Delta_i$) is not sufficient to transmit the packet that is at the front of the queue.

Visit to a Generic Synchronous Queue i, i=1 ... $N_S$ During the Minor Cycle

During the minor (or recovery) cycle a synchronous queue can transmit only one packet, provided the variable $\Delta_i$ has a strictly positive value. If transmission takes place, the variable $\Delta_i$ is decremented by the transmission time.

Visit to a Generic Asynchronous Queue j, with j=1, ..., $N_A$

An asynchronous queue can only be serviced if the server's visit takes place before the expected instant. To calculate whether the server's visit is in advance, subtract the time that has elapsed since the previous visit and the accumulated delay $L_j$ from the target rotation time TTRT.

If this difference is positive, it is the period of time for which the asynchronous queue j has the right to be serviced, and in this case the variable $L_j$ is reset.

If the difference is negative, the server is late and the queue j cannot be serviced; in this case the delay is stored in the variable $L_j$. The asynchronous queue service ends when the queue is empty, or the time available (which is decremented each time a packet is transmitted) is not sufficient to transmit the packet that is at the front of the queue.

Visit Sequence During a Revolution

A double scan is made on all the synchronous queues (major and minor cycles) during one revolution, and then the asynchronous queues are visited. The minor cycle ends the moment one of the following events takes place:
  the last synchronous queue has been visited;
  a period of time that is equal to or greater than the sum of the capacity of all the synchronous queues has elapsed since the beginning of the major cycle.

Analytic Guarantees

The synchronous capacities are linked to the target rotation time TTRT and to the duration of the transmission of the longest packet $\tau_{max}$ by the following inequality, which must always be verified:

$$\sum_{i=1}^{N_S} H_i + \tau_{max} \leq TTRT \quad (1)$$

Minimum Transmission Rate for Synchronous Flows

In hypothesis (1), the system as illustrated herein guarantees that the following normalised transmission rate will be guaranteed for each synchronous flow:

$$\gamma_i = \frac{N_A + 1}{N_A + \sum_{h=1}^{N_S} X_h + \alpha} \cdot X_i$$

with:

$X_i = H_i/TTRT$ $\alpha = \tau_{max}/TTRT$ and it is also possible to guarantee that, given any period of time $[t_1, t_2)$ in which the generic synchronous queue i is never empty, the service time $W_i(t_1, t_2)$ received from the queue i in $[t_1, t_2)$ verifies the following inequality:

$$\gamma_i \cdot (t_2 - t_1) - W_i(t_1, t_2) \leq \Lambda_i < \infty \quad (2)$$

where:

$$\Lambda_i = \begin{cases} H_i \cdot (2 - \gamma_i) + (1 + \gamma_i) \cdot \tau_i, se H_i \geq \tau_i \\ \tau_i + 2 \cdot H_i, se H_i < \tau_i \end{cases}$$

and $\tau_i$ is the transmission time of the longest packet for the flow i.

Expression (2) seen previously establishes that the service supplied by the i synchronous flow system of the type described here does not differ by more than $\Lambda_i$ from the service that the same flow would experience if it were the only owner of a private transmission channel with a capacity equal to $\gamma_i$ times that of the channel managed by the system illustrated in this invention. $\Lambda_i$ therefore represents the maximum service difference with respect to an ideal situation.

A synchronous flow can therefore feature a parameters called latency, which is calculated as follows:

$$\Theta_i = \begin{cases} \left(2 + \frac{\tau_i}{H_i}\right) \dfrac{N_A TTRT + \tau_{max} + \sum_{h \in S} H_i}{N_A + 1} + \tau_i - H_i, se H_i \geq \tau_i \\ \left(2 + \frac{\tau_i}{H_i}\right) \dfrac{N_A TTRT + \tau_{max} + \sum_{h \in S} H_i}{N_A + 1}, se H_i < \tau_i \end{cases}$$

or, for $N_A \to \infty$:

$$\Theta_i^* = \begin{cases} \left(2 + \frac{\tau_i}{H_i}\right) TTRT + \tau_i - H_i, se H_i \geq \tau_i \\ \left(2 + \frac{\tau_i}{H_i}\right) TTRT, se H_i < \tau_i \end{cases}$$

Given a switching node that implements the solution described herein, if the traffic input on a synchronous flow on that node is limited by a so-called "leaky-bucket" of parameters $(\sigma, \rho)$, the following guarantees can be given:

a) Maximum delay on a single node for a synchronous flow

Each packet has a delay that is not greater than:

$D = \sigma/\rho + \Theta_i$ b) Maximum memory occupation on a node for a synchronous flow The amount of memory occupied by packets in a synchronous flow packet is:

$B = \sigma + \rho \cdot \Theta_i$ c) Maximum delay on a route of n nodes for a synchronous flow Let $\Phi_1 \ldots \Phi_N$ N be switching nodes that implement the system described herein; let $\Theta_i^j$ be the latencies calculated on each of the $\Phi_j$ nodes and let:

$$\overline{\Theta}_i = \sum_{j=1}^{N} \Theta_i^j$$

In this case it is possible to define an upper limit for the maximum delay for a packet to cross the N nodes, provided that the traffic input on the first node is limited by a leaky-bucket of parameters (σ, ρ); this limit is:

$$D_N = \sigma/\rho + \overline{\Theta}_i$$

The value $\Theta_i^\ddagger \geq \Theta_i$ can be employed in each of the three guarantees a), b), c); this means that the limits that do not depend on the number of active asynchronous flows can be calculated.

Parameter Selection

The ability to guarantee that the synchronous flows receive a minimum service rate no lower than that requested is subordinate to a correct selection of the synchronous capacities $H_i$, i=1 ... $N_s$. Assuming that each synchronous flow i requires a minimum transmission rate $r_i$, it is necessary to allocate the synchronous capacities to verify the following inequality:

$$\gamma_i \geq r_i/C \quad (3)$$

The solution described herein allocates the synchronous capacities according to two different schemes called local and global allocation respectively.

Local Allocation

The synchronous capacities are selected as follows:

$$H_i = \frac{r_i \cdot TTRT}{C}$$

In this way, the inequality (1) is verified if the transmission rates requested verify the following inequality:

$$\sum_{h=1}^{N_S} r_h/C \leq 1 - \alpha \quad (4)$$

Each synchronous flow is guaranteed a normalised service rate equal to:

$$\gamma_i = \frac{[N_A + 1] \cdot r_i/C}{N_A + \sum_{h=1}^{N_S} r_h/C + \alpha} \quad (5)$$

The value of $\gamma_i$ given by expression (5) verifies the inequality (3).

Global Allocation

According to this scheme, which requires $N_A > 0$, the synchronous capacities are selected as follows:

$$H_i = \frac{(N_A + \alpha) \cdot r_i/C}{N_A + 1 - \sum_{h=1}^{N_S} r_h/C} \cdot TTRT$$

In the global allocation scheme the sum of the transmission rates requested must also remain below the inequality (4). If (4) is verified, the normalised service rate of a synchronised flow is $\gamma_i = r_i/C$.

The global scheme guarantees greater use of the channel's transmission capacity than the local scheme, in that it allocates less capacity to the synchronous flows, leaving more bandwidth for the asynchronous flow transmission.

On the other hand, the use of a global scheme means that all the synchronous capacities are to be recalculated each time the number of flows (synchronous or asynchronous) present in the system changes; the use of a local scheme, however, means that the capacities can be established independently from the number of flows in the system.

Selection of TTRT

The following scheme can be given to show the selection of TTRT in the solution according to the invention.

Given a set of synchronous flows with requested transmission rates that verify the inequality:

$$\sum_{h=1}^{N_S} r_h/C < 1$$

TTRT must be selected according to the following inequality:

$$TTRT \geq \frac{\tau_{\max}}{1 - \sum_{h=1}^{N_S} r_h/C}$$

The pseudo-code illustrated below analytically describes the behaviour of a system as given in the invention.

Flow Initialisation

```
Sync_Flow_Init (synchronous flow i)
{    A_i=0;
     Select_synchronous_bandwidth H_i;
}
Async_Flow_Init (asynchronous flow j)
{    L_j = 0 ;
     last_visit_time_j = start_of_curr_revolution;
}
```

Visit to a Generic Synchronous Queue i, i=1 .... $N_S$, During the Major Cycle

```
Major_Cycle_Visit (synchronous flow i)
{    A_i += H_i;
     q=first_packet_transmission_time;
     while ((A_i >= q) and (q > 0))
     {    transmit_packet (q);
```

```
        Δᵢ -= q;
        elapsed_time+= q;
    }
    if (q=0) Δᵢ=0;
```

Visit to a Generic Synchronous Queue i, i=1 ... $N_S$, During the Minor Cycle

```
Minor_Cycle_Visit (synchronous flow i)
{   q=first_packet_transmission_time;
    if (q > 0)
    {
        transmit_packet (q);
        Δᵢ -= q;
        elapsed_time += q;
    }
    if (q=0) Δᵢ=0;
}
```

Visit to a Generic Asynchronous Queue j, j=1 ... $N_A$

```
Async_Flow_Visit (asynchronous flow j)
{   t = current_time;
    earliness = TTRT-Lⱼ - (t-last_visit_timeⱼ);
    if ( earliness > 0 )
    {   Lⱼ = 0;
        transmit_time = earliness;
        q=first_packet_transmission_time;
        while ((transmit_time>=q) and (q > 0))
        {
            transmit_packet (q);
            transmit_time -= q;
        }
    }
    else Lⱼ = - earliness;
    last_visit_timeⱼ = t;
}
```

Visit Sequence During a Revolution

```
PTTSD revolution ( )
{   elapsed_time=0;
    for (i=1 to N_S) Major_Cycle_Visit (i);
    i = 1;
    while((elapsed_time<sum(Hₕ)) and (i<=N_S))
    {
        if (Δᵢ>0) Minor_Cycle_Visit (i);
        i ++;
    }
    for (j=1 to N_A) Async_Flow_Visit (j);
}
```

Obviously the details of how this is done can be altered with respect to what has been described, without however, leaving the context of this invention.

The invention claimed is:

1. A method for the scheduling of a service resource shared among several information packet flows that generate respective associated queues, said flows including synchronous flows ($i_s$) that require a guaranteed minimum service rate ($r_i$) and asynchronous flows ($j_A$) that use the service capacity of the resource that is left unused by the synchronous flows, method making use of a server and comprising the following steps:

(a) causing said server to visit the respective queues associated to said flows (i, j) in successive cycles on the basis of a target rotation time value (TTRT), which identifies the time necessary for the server to complete a visit cycle on said respective queues;

(b) associating each synchronous flow (i) with a respective synchronous capacity value (Hi) indicating a maximum period of time for which the respective synchronous flow can be serviced before the server moves on;

(c) associating each asynchronous flow (j) with a first respective delay value (Li) that identifies a value that must be made up for the respective queue to have the right to be serviced, and a second respective value (last_visit_time) that indicates an instant in which the server visited the respective queue in a previous cycle, determining for said respective queue, a time that has elapsed since the server's previous visit;

(d) servicing each queue associated to a synchronous flow (i) for a maximum service time relative to said respective value of synchronous capacity ($H_i$);

(e) servicing each queue associated to an asynchronous flow (j) only if the server's visit occurs before the expected instant, said advance being determined as the difference between said target rotation time value (TTRT) and time that has elapsed since the server's previous visit and the accumulated delay; if positive, this difference defining a maximum service time for each asynchronous queue; and (f) defining said respective synchronous capacity value ($H_i$) for the queue associated to the i-th synchronous flow by, insuring that:

($f_1$) a sum of the synchronous capacity values for said synchronous flows plus the duration of the longest packet services by said shared service resource ($T_{max}$) does not exceed said target rotation time value (TTRT); and ($f_2$) said target rotation time value (TTRT) is not lower than a ratio of said longest packet serviced by said shared service resource ($T_{max}$) to a complement to one of the sum over said synchronous flows of the minimum service rates ($r_i$) required by said synchronous flows normalized to the service capacity (C) of said shared service resource.

2. The method defined in claim 1 which includes the step of defining said respective synchronous capacity value ($H_i$) for the queue associated to the i-th synchronous flow as the product of the minimum service rate required by said i-th synchronous flow ($r_i$) and said target rotation time value (TTRT) normalized to the service capacity of said shared service resource (C).

3. The method defined in claim 1 which includes the step of defining said respective synchronous capacity value ($H_i$) for the queue associated to the i-th synchronous flow by:

defining a factor ($\alpha$) such that the sum over said synchronous flows of the minimum service rates ($r_i$) required by said synchronous flows normalized to the service capacity (C) of said shared service resource is not larger than the complement to one of said factor ($\alpha$); and defining said respective synchronous capacity value ($H_i$) for the queue associated to the i-th synchronous flow as said target rotation time value (TTRT) times the ratio of a first and a second parameter, wherein:

said first parameter is the sum of the number of said asynchronous flows ($N_A$) and said factor ($\alpha$), said sum times the minimum service rates ($r_i$) required by said synchronous flows normalized to the service capacity (C) of said shared service resource, and said second parameter is the sum of the number of said asynchronous flows ($N_A$) plus the complement to one of the sum over said synchronous flows of the minimum service rates ($r_i$) required by said synchronous flows normalized to the service capacity (C) of said shared service resource.

4. The method defined in claim 1 which includes the step of insuring that the sum over said synchronous flows of the minimum service rates ($r_i$) required by said synchronous flows normalized to the service capacity (C) of said shared service resource does not exceed unity.

5. The method defined in claim 1 wherein said respective synchronous capacity value ($H_i$) for the queue associated to the i-th synchronous flow is defined by satisfying:

i) the expressions $$\sum_{i=1}^{N_S} H_i + \tau_{max} \leq TTRT$$

$$TTRT \geq \frac{\tau_{max}}{1 - \sum_{h=1}^{N_S} r_h/C}$$

ii) as well as the last one of the following expressions $$H_i = \frac{r_i \cdot TTRT}{C} \text{ and}$$

$$H_i = \frac{(N_A + \alpha) \cdot r_i/C}{N_A + 1 - \sum_{h=1}^{N_S} r_h/C} \cdot TTRT$$

where:
$H_i$ is said respective synchronous capacity value ($H_i$) for the queue associated to the i-th synchronous flow,
the summations are extended to all the synchronous flows, equal to $N_s$,
$N_A$ is the number of said asynchronous flows,
$T_{max}$ is the duration of the longest packet service by said shared service resource,
TTRT is said target rotation time value,
C is the service capacity of said shared service resource,
$r_i$ is the minimum service rate required by the i-th synchronous flow, with $$\sum_{h=1}^{N_S} r_h/C < 1, \text{ and}$$

$\alpha$ is a parameter that gives $$\sum_{h=1}^{N_S} r_h/C \leq 1 - \alpha.$$

6. The device defined in claim 1 wherein during each of said successive cycles, said server performs a double scan on all the queues associated to said synchronous flows ($i_S$) and then visits the queues associated to said asynchronous flows ($j_A$).

7. The device defined in claim 6 which includes the following steps:
associating with each synchronous flow (i) a further value ($\Delta_i$) indicating the amount of service time that is available to the respective flow,
during a major cycle of said double scan servicing each queue associated to a synchronous flow (i) for a period of time equal to the maximum said further value ($\Delta_i$), and
during a minor cycle of said double scan servicing only one packet of each queue associated to a synchronous flow (i), provided that said further value ($\Delta_i$) is strictly positive.

8. The device defined in claim 7 which includes the step of incrementing said further value ($\Delta_i$) by said respective value of the synchronous capacity ($H_i$) when the queue is visited during the major cycle of said double scan.

9. The device defined in claim 7 which includes the operation of decrementing said further value ($\Delta_i$) of the transmission time by each packet serviced.

10. The device defined in claim 7 wherein the servicing of each queue associated to a synchronous flow (i) during the major cycle of said double scan ends when one of the following conditions occurs:
the queue is empty,
the time available, represented by said further value ($\Delta_i$), is not sufficient to service the packet at the front of the queue.

11. The device defined in claim 10 which includes the operation of resetting said further value ($\Delta_i$) when the respective queue is empty.

12. The device defined in claim 7 which includes the step of decrementing the service time of said further value ($\Delta_i$) in the presence of a service given during the minor cycle of said double scan.

13. The device defined in claim 7 wherein during said double scan of all the queues associated to said synchronous flows (I), said minor cycle ends when one of the following conditions is satisfied:
the last queue associated to a synchronous flow (i) has been visited,
a period of time not less than the sum of the capacities ($H_i$) of all of the queues associated to said synchronous flows (i) has elapsed since the beginning of said major cycle of said double scan.

14. The device defined in claim 7 which includes the step of initializing said further value ($\Delta_i$) to zero.

15. The device defined in claim 1 wherein in the case that said difference is negative, each said queue associated to an asynchronous flow (j) is not serviced and the value of said difference is accumulated with said delay ($L_j$).

16. The device defined in claim 1 wherein the service of a queue associated to an asynchronous flow (j) ends when one of the following conditions is satisfied:
the queue is empty,
the time available is not sufficient to transmit the packet that is at the front of the queue.

17. The device defined in claim 1 wherein said first respective value ($L_j$) and said second respective value (last_visit_time) are respectively initialized to zero and to a moment of startup of the current cycle when the flow is activated.

18. A system for the scheduling of a service resource shared among several information packet flows that generate respective associated queues, said flows including synchronous flows ($i_s$) that require a guaranteed minimum service rate and asynchronous flows ($j_A$) destined to use the service capacity of said resource left unused by the synchronous flows, the system including a server able to visit the respective queues associated to said flows (i, j) in successive cycles, which is configured to perform the following operations:

determine a target rotation time value (TTRT) that identifies the time necessary for the server to complete a visiting cycle of said respective queues, associate to each synchronous flow (i) a respective synchronous capacity value ($H_i$) indicating the maximum amount of time for which a synchronous flow can be serviced before moving on to the next, associate to each asynchronous flow (j) a first respective delay value ($L_j$) that identifies the delay that must be made up for the respective queue to have the right to be serviced, and a second respective value (last_visit_time) that indicates the instant in which in the previous cycle the server visited the respective queue, determining for said respective queue, the time that has elapsed since the server's previous visit, service each queue associated to a synchronous flow (i) for a maximum period of time relating to said respective synchronous capacity value ($H_i$), and service each queue associated to an asynchronous flow (j) only if the server's visit occurs before the expected instant, said advance being determined as the difference between said target rotation time (TTRT) and the time that has elapsed since the server's (10) previous visit and the accumulated delay difference, if positive, defining the maximum service time for each said asynchronous queue, the system being configured to define said respective synchronous capacity value ($H_i$) for the queue associated to the i-th synchronous flow by ensuring that:

the sum of the synchronous capacity values for said synchronous flows plus the duration of the longest packet serviced by said shared service resource (T) does not exceed said target rotation time value (TTRT); and said target rotation time value (TTRT) is not lower than the ratio of said longest packet serviced by said shared service resource (Tmm) to the complementary to one of the sum over said synchronous flows of the minimum service rates (ri) required by said synchronous flows normalized to the service capacity (C of said shared service resource.

19. The system defined in claim 18 which is configured for defining said respective synchronous capacity value ($H_i$) for the queue associated to the i-th synchronous flow as the product of the minimum service rate required by said i-th synchronous flow ($r_i$) and said target rotation time value (TTRT) normalized to the service capacity of said shared service resource (C).

20. The system defined in claim 18 which is configured for defining said respective synchronous capacity value (Hi) for the queue associated to the i-th synchronous flow by:

defining a factor (a) such that the sum over said synchronous flows of the minimum service rates (ri) required by said synchronous flows normalized to the service capacity (C) of said shared service resource is not larger than the complementary to one of said factor (a);

defining said respective synchronous capacity value (Hi) for the queue associated to the i-th synchronous flow as said target rotation time value (TTRT) times the ratio of a said first and a second parameter, wherein:

said first parameter is the sum of the number of said asynchronous flows ($N_A$) and said factor ($\alpha$), said sum times the minimum service rates (ri) required by said synchronous flows normalized to the service capacity (C) of said shared service resource, and said second parameter is the sum of the number of said asynchronous flows ($N_A$) plus the complementary to one of the sum over said synchronous flows of the minimum service rates (ri) required by said synchronous flows normalized to the service capacity (C) of said shared service resource.

21. The system defined in claim 18 which is configured for ensuring that the sum over said synchronous flows of the minimum service rates (ri) required by said synchronous flows normalized to the service capacity (C) of said shared service resource does not exceed unity.

22. The system defined in claim 18 which is configured to define said respective synchronous capacity value ($H_i$) for the queue associated to the i-th synchronous flow by ensuring that the following are satisfied:

i) the expressions $$\sum_{i=1}^{N_S} H_i + \tau_{max} \le TTRT$$

$$TTRT \ge \frac{\tau_{max}}{1 - \sum_{h=1}^{N_S} r_h/C}$$

i) as well as at least one of the following expressions $$H_i = \frac{r_i \cdot TTRT}{C} \quad \text{and} \quad H_i = \frac{(N_A + \alpha) \cdot r_i/C}{N_A + 1 - \sum_{h=1}^{N_S} r_h/C} \cdot TTRT$$

where:

$H_i$ is the said respective synchronous capacity value:
($H_i$) for the queue associated to the i-th synchronous flow,
the summations are extended to all the synchronous flows, equal to $N_s$,
$N_A$ is the number of said asynchronous flows,
$T_{max}$ is the service duration of the longest packet by said shared service resource,
TTRT is said target rotation time value,
C is the service capacity of said shared service resource,
$r_i$ is the minimum service rate requested by the i-th synchronous flow, with $$\sum_{h=1}^{N_S} r_h/C < 1, \text{ and}$$

$\alpha$ is a parameter that gives $$\sum_{h=1}^{N_S} r_h/C \le 1 - \alpha.$$

23. The system defined in claim 18 wherein, during each of the said successive cycles, said server (10) performs a double scan on all the queues associated to said synchronous flow (i=1, 2, ..., $N_S$) and then visits the queues associated to said asynchronous flows (j=1, 2, ..., $N_A$).

24. The system defined in claim 18 wherein:
- a further value ($\Delta_i$), indicating the amount of service time available to the respective flow, is associated to each synchronous flow (i),
- during a major cycle of said double scan, each queue associated to a synchronous flow (i) is serviced for a period of time equal to the maximum further value ($\Delta_i$), and
- during a minor cycle of said double scan the system services only one packet of each queue associated to a synchronized flow (i), provided said further value ($\Delta_i$) is strictly positive.

25. The system defined in claim 24 wherein said further value ($\Delta_i$) is incremented by said respective synchronous capacity value ($H_i$) when the queue is visited during the major double scan cycle.

26. The system defined in claim 24 wherein said further value ($\Delta_i$) is decremented by the transmission time of each packet serviced.

27. The system defined in claim 24 which is configured so that the service of each queue associated to a synchronous flow (i) during the major cycle of said double scan ends when one of the following conditions occurs:
- the queue is empty,
- the time available, represented by said further value ($\Delta_i$), is not sufficient to serve the packet at the front of the queue.

28. The system defined in claim 27 wherein said further value ($\Delta_i$) is reset when the respective queue is empty.

29. The system defined in claim 24 wherein in the presence of a service given during the minor cycle of said double scan, said further value ($\Delta_i$) is decremented by the amount of service time.

30. The system defined in claim 24 wherein during said double scan on all the queues associated to said synchronous flows (i), said minor cycle ends when one of the following conditions is satisfied:
- the last queue associated to a synchronous flow (i) has been visited,
- a period of time not less than the sum of the capacities (Hi) of all of the queues associated to said synchronous flows (i) has elapsed since the beginning of said major cycle of said double scan.

31. The system defined in claim 24 wherein said further value ($\Delta_i$) is initialized to zero.

32. The system defined in claim 24 wherein, if said difference is negative, each said queue associated to an asynchronous flow (j) is not serviced and the value of said difference is accumulated with said delay ($L_j$).

33. The system defined in claim 24 wherein the service of a queue associated to an asynchronous flow (j) ends when one of the following conditions is satisfied:
- the queue is empty,
- the time available is not sufficient to transmit the packet that is at the front of the queue.

34. The system defined in claim 24 wherein said first respective value ($L_j$) and said second respective value (last_visit_time) are respectively initialized to zero and to the moment of startup of the current cycle when the flow is activated.

* * * * *